(12) United States Patent
Schmauβ et al.

(10) Patent No.: US 7,965,072 B2
(45) Date of Patent: Jun. 21, 2011

(54) CURRENT SOURCE AND CONTROL DEVICE

(75) Inventors: Harald Schmauβ, Scheuer (DE);
Walter Schrod, Regensburg (DE)

(73) Assignee: VDO Automotive AG, Munich (DE)

( * ) Notice: Subject to any disclaimer, the term of this patent is extended or adjusted under 35 U.S.C. 154(b) by 659 days.

(21) Appl. No.: 12/064,860

(22) PCT Filed: Jul. 24, 2006

(86) PCT No.: PCT/EP2006/064558
§ 371 (c)(1),
(2), (4) Date: Mar. 19, 2008

(87) PCT Pub. No.: WO2007/023053
PCT Pub. Date: Mar. 1, 2007

(65) Prior Publication Data
US 2008/0231245 A1    Sep. 25, 2008

(30) Foreign Application Priority Data

Aug. 26, 2005    (DE) .......................... 10 2005 040 532

(51) Int. Cl.
*G05F 3/04* (2006.01)
(52) U.S. Cl. ...................................................... 323/312
(58) Field of Classification Search .................. 323/311, 323/312, 316, 282, 283, 351
See application file for complete search history.

(56) References Cited

U.S. PATENT DOCUMENTS

| 4,491,744 | A | * | 1/1985 | Corey ........................... 327/109 |
| 5,041,959 | A | * | 8/1991 | Walker ............................ 363/79 |
| 6,859,022 | B2 | | 2/2005 | Oglesbee |
| 6,909,268 | B2 | * | 6/2005 | Taghizadeh-Kaschani .. 323/284 |

FOREIGN PATENT DOCUMENTS

| DE | 19814594 A1 | 10/1999 |
| DE | 19952950 A1 | 6/2001 |
| DE | 10158553 A1 | 6/2002 |
| DE | 102004030249 A1 | 1/2005 |
| DE | 10331057 A1 | 2/2005 |
| DE | 10336633 A1 | 3/2005 |
| DE | 102004054109 A1 | 7/2005 |
| EP | 1489291 A1 | 12/2004 |
| JP | 11354853 A | 12/1999 |
| JP | 2002217462 A | 8/2002 |
| JP | 2005039990 A | 2/2005 |
| JP | 2005171800 A | 6/2005 |
| WO | 9015922 A1 | 12/1990 |

* cited by examiner

*Primary Examiner* — Adolf Berhane
(74) *Attorney, Agent, or Firm* — Laurence A. Greenberg; Werner H. Stemer; Ralph E. Locher

(57) ABSTRACT

A current source contains a first switching element which is provided with a control input and is embodied and arranged in such a way that an output flow on an output side of a current source can be adjusted according to a control signal at the control input. The current source also contains a reference resistance that is electrically coupled to a first switching element in such a way that a potential difference above the reference resistance represents the output flow. The adjustment signal of a regulator unit depends on the voltage difference above the reference resistance, is the control signal of the first switching element, and contains a time function element which limits a first value of the output flow to a maximum duration and then reduces the value of the output flow.

7 Claims, 3 Drawing Sheets

CURRENT SOURCE AND CONTROL DEVICE

BACKGROUND OF THE INVENTION

Field of the Invention

The invention relates to a current source and a control device. These current sources are particularly used in a control device, which is particularly provided for the use for one or several piezo actuators.

Increasingly strict legal regulations regarding the permitted pollutant emissions of combustion engines, which are arranged in vehicles, make it necessary to undertake diverse measures, by which the pollutant emissions are reduced. A starting point here is to reduce the pollutant emissions generated during the combustion process of the air/fuel mixture. The formation of carbon-particulate matter is especially heavily dependent on the conditioning of the air/fuel mixture in the respective cylinder of the combustion engine. So as to achieve a very good mixture preparation, fuel is increasingly added under a very high pressure. In the case of diesel combustion engines, the fuel pressures are up to 2000 bar. For these uses, injection valves are increasingly used with a piezo actuator as actuator. Piezo actuators are characterized by very short reaction times. Injection valves of this type are thus possibly suitable to metering fuel several times within a work cycle of a cylinder of the combustion engine.

A particularly good mixture preparation can be achieved if one or more pre-injections take place prior to a main injection, which is also referred to as pilot injection, wherein a very small amount of fuel mass is to be metered for the individual pre-injection. A precise piloting of the injection valve is particularly important in these cases.

In connection with the precise piloting of the injection valve, an important role is accorded to the charging and discharging of the piezo actuator. For this purpose, a performance end step is regularly provided, which however cannot discharge the piezo actuator completely during the discharge process or cannot perform this with the demanded and available durations. For the complete discharging, a switching element is provided in this regard which can assume this object, but which is thereby subject to thermal loads. The switching element is part of a current sink, which can also be called current source.

BRIEF SUMMARY OF THE INVENTION

It is the object of the invention to create a current source and a control device which is simple and reliable.

The object is achieved by the characteristics of the independent claims. Advantageous embodiments of the invention are characterized in the dependent claims.

The invention is characterized by a current source with a first switching element, which has a control input and is formed and arranged in such a manner that an output current can be adjusted at the output side of the current source as a function of a control signal at its control input. A reference resistor is electrically coupled to the first switching element in such a manner that a voltage drop over the reference resistor is representative of the output current. A regulator unit is provided, the input signal of which depends on the voltage drop over the reference resistor. The input signal of the regulator unit is the control signal of the first switching element. It comprises a timing relay which limits a first amount of the output current to a maximum duration and afterwards reduces the amount of the output current. With a suitable setting of the maximum duration, a high amount of the output current can thus be adjusted for the maximum duration, without thermally damaging the first switching element. The first switching element is further protected better against the thermal destruction in the case of a short circuit at the output of the current source on a supply potential by the reduction of the amount of the output current occurring after the maximum duration. In particular, a very high protection against thermal destruction can thus be ensured by a suitable reduction of the output current, that is, without a high wiring effort, and thereby, a very economical current source is possible. The current source is thus particularly short-circuit proof with regard to its output.

The invention is achieved by the use of such a current source with regard to the control device. According to an advantageous embodiment of the current source, the maximum duration depends on an integral of the output current. Thus, a thermal overload of the first switching element can be reliably avoided even with an interim switching off of the output current.

According to a further advantageous embodiment of the current source, the first amount of the output current can be adjusted again after a given relaxation duration. This has the advantage that the first amount can quickly be adjusted again with a suitable choice of the relaxation duration and that a thermal damage of the first switching element can be avoided at the same time in this manner.

According to a further advantageous embodiment of the current source, it is embodied in such a manner that the relaxation duration starts with the omission of an external source which drives the output current. Such an external source can for example be a piezo actuator or also a voltage source, such as for example a wiring system supply. Thus, a targeted and short-circuit proof discharge of the piezo actuator is possible in a particularly reliable manner.

According to a further advantageous embodiment of the current source, the timing relay comprises a RC member, which is formed by a resistor and a capacitor arranged electrically in series. The RC member is arranged electrically parallel to the reference resistor. A control input of a timing relay switching element is electrically coupled to a measuring tap point of the RC member, which lies electrically between the resistor and the capacitor of the RC member. The timing relay switching element is arranged in such a manner that it influences the input signal of the regulator unit as a function of its control signal. The timing relay is formed particularly simply in this manner.

According to a further advantageous embodiment of current source, the timing relay comprises a resistor and an auxiliary timing relay switching element, which are arranged electrically in series. The resistor can be connected in an electrically parallel manner to the reference resistor by means of the auxiliary timing relay switching element. A control input of a further timing relay switching element is electrically coupled to a measuring tap point, which lies electrically between the resistor and the auxiliary time relay switching element. The further timing relay switching element is arranged in such a manner that it influences the input signal of the regulator unit as a function of its control signal. A simple wired realization is thus possible.

In this connection, it is particularly advantageous if a control output of a control unit is electrically coupled to a control input of the auxiliary timing relay switching element. This control input can thus be used simply, and possibly other influential magnitudes can be considered during adjustment of the maximum duration or possibly the relaxation duration.

Exemplary embodiments of the invention are explained below with reference to the schematic drawings, in which:

DESCRIPTION OF THE INVENTION

Figure 1:
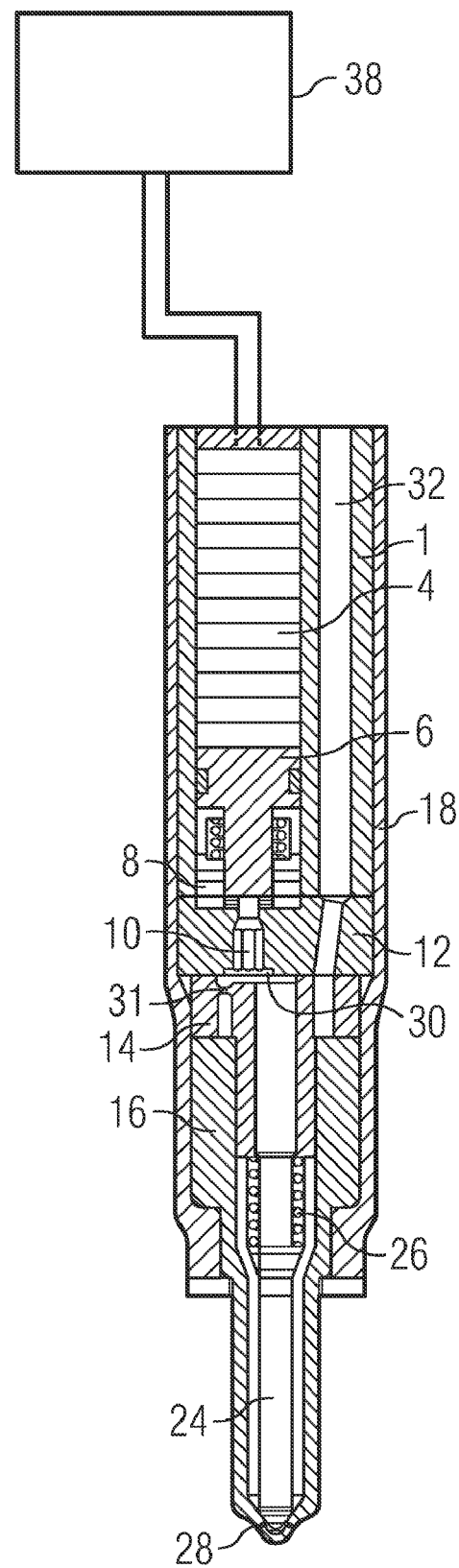
FIG. 1 shows an injection valve with a control device including a current source.

Elements having the same construction or function are designated with the same reference numerals in all figures.

An injection valve (FIG. 1) has an injector housing 1 with a recess, into which is inserted a piezo actuator PAKT1, that is, a piezo actuator, which is coupled to a transducer 6. The transducer 6 is arranged in a leakage space 8. A switching valve 10, which is preferably formed as a servo valve, is arranged in such a manner that it de-energizes a leakage fluid depending on its switching position, which is preferably fuel in this embodiment. The switching valve is coupled to the piezo actuator PAKT 1 via the transducer 6, and is driven thereby, that is, the switching position of the switching valve 10 is adjusted by means of the piezo actuator PAKT 1. The piezo actuator PAKT 1 can possibly also act on the switching valve 10 without the interconnection of the transducer 6. The switching valve 10 is arranged in a valve plate 12. It comprises a valve member, the position of which can be adjusted by means of the piezo actuator PAKT 1 and which is in abutment with the valve plate in a switching position and prevents the de-energization of fuel into the leakage space in this manner. In a further switching position, it is distanced from a wall of the valve plate 12 and enables the de-energization of the fuel into the leakage space 8 in this manner. The piezo actuator comprises a stack of 60 piezo elements. The stack 60 of piezo elements includes for example 200 piezo elements, which are layered on one another. The stack 60 of the piezo elements is preferably surrounded by a tubular spring, which clamps the stack 60 of the piezo elements between the transducer 6 and a closure element.

The injection valve further comprises a needle guide body 14 and a nozzle body 16. The valve plate 12, the needle guide body 14 and the nozzle body 16 form a nozzle component assembly, which is secured to the injector housing 1 by means of a nozzle clamping nut 18.

The needle guide body 14 has a recess which is continued as a recess of the nozzle body 16 in the nozzle body 16, and in which is arranged a nozzle needle 24. The nozzle needle 24 is guided in the needle guiding body 14. A nozzle spring 26 clamps the nozzle needle 24 into a closure position, in which it prevents a fuel flow through an injection aperture 28.

A control space 30 is formed at the axial end of the nozzle needle 24, which faces the valve plate 12, which space is hydraulically coupled to a high pressure bore 32 by means of an inlet throttle 31. If the switching valve 10 is in its closure position, the control space 30 is hydraulically decoupled from the leakage space 8. This results in the pressure in the control space 30 essentially adapting to the pressure in the high pressure bore 32 after the closure of the switching valve 10. The high pressure bore 32 is hydraulically coupled to a high pressure fuel store during the use of the injection valve in a combustion engine and is supplied with fuel under a pressure of for example up to 2000 bar in this manner.

Due to the fluid pressure in the control space 30, a force is applied to a front surface of the nozzle needle 24 in the closure direction of the nozzle needle 24 via the control space 30. The nozzle needle 24 further comprises a shoulder, which is axially spaced from its front surface, which is charged with fluid flowing through the high pressure bore 32 in such a manner that a force acting in an opening manner acts on the nozzle needle 24, that is, opposite to the closure direction. In its closure position, the nozzle needle 24 prevents a fuel flow through the injection nozzle 28. If the nozzle needle 24 moves into the control space 30 starting from its closure position, it releases the fuel flow through the injection nozzle 28, in particular in its opened position, in which it is in abutment with the region of the wall of the control space 30, which is formed by the valve plate 12.

Whether the nozzle needle 24 is in its opened or closed position depends on whether the force which is generated at the shoulder of the nozzle needle 24 by the pressure of the fluid prevailing there, is larger or smaller than the force which is generated by the nozzle spring 26 and the pressure acting on the front surface of the nozzle needle 24.

If the switching valve 10 is in its opened position, fluid flows from the control space 30 through the switching valve 10 into the leakage space 8. With a suitable dimensioning of the inlet throttle, the pressure in the control space 30 drops then, which finally leads to a movement of the nozzle needle into its opened position. The pressure of the fluid in the leakage space 8 is clearly smaller than the pressure of the fluid in the high pressure bore.

A control device 38 is assigned to the injection valve. The control device 38 is embodied so as to generate an input signal SG for the piezo actuator PAKT1 of the injection valve. The control device 38 is preferably further embodied so as to generate input signals for further piezo actuators PAKT2-4, which are assigned to further injection valves.

The input signal SG is preferably a current signal, which is preferably pulse-height modulated. Starting with a start of a charging process, a given number of pulses, as for example 20, is preferably generated with a given temporal duration and period, until the charging process is finished. The electric energy to be supplied to the piezo actuator PAKT 1 during the charging process is adjusted via the height of the respective pulse. The energy to be supplied to the piezo actuator PAKT 1 during a charging process LV is determined as a function of operating parameters. The energy supplied to the piezo actuator PAKT 1 influences its axial lift and thereby also the course of the pressure in the control space 30.

The control device 40 is further embodied so as to carry out a discharge process of the piezo actuator PAKT 1. A given number of discharge pulses is preferably generated for this, as e.g. 20, with a given temporal duration and period. The electric energy which is removed from the piezo actuator PAKT 1 during the discharging process is adjusted via the height of the respective discharge pulses. The energy removed from the actuator influences its axial lift reduction.

Figure 2:
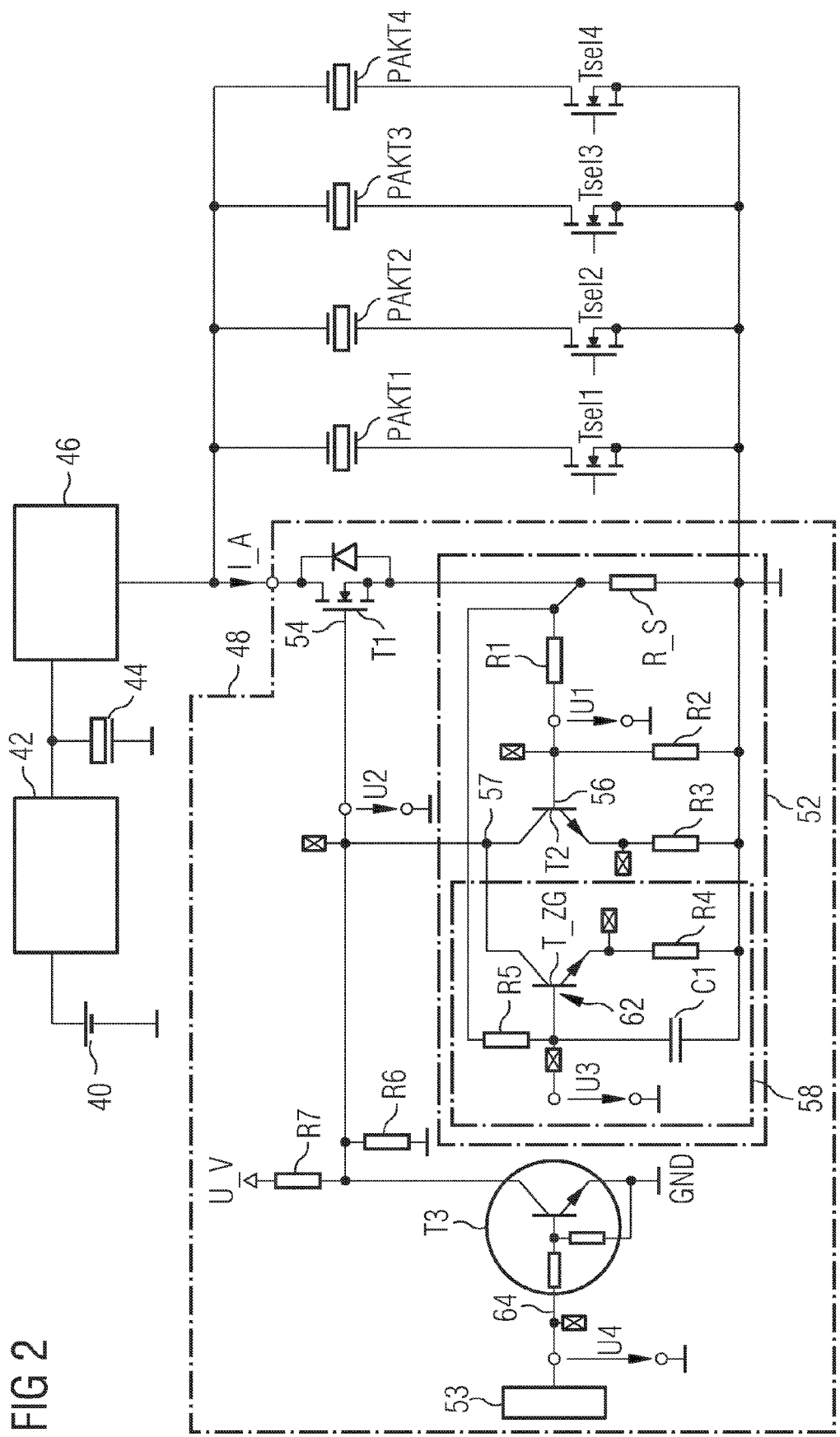
FIG. 2 shows a more detailed illustration of the control device with the current source.

One part of the control device 38 is depicted according to FIG. 2. The control device 38 comprises a voltage amplifier 42, which is also called DC/DC transducer, and which is electrically coupled to a wiring system 40, which is embodied so as to supply the voltage amplifier 42 with a given voltage, and thus forms a voltage source. The wiring system comprises a vehicle battery for example.

The voltage amplifier 42 is electrically coupled to a performance end stage 46. A capacitor 44 is preferably interconnected, and in such a manner that in the interim electrical energy can be stored in the capacitor 44 during the discharge process of the respective piezo actuators PAKT 1 to PAKT 4 and can be used for future charging processes.

The performance end stage 46 of the control device 38 is electrically coupled to the piezo actuators PAKT 1 to PAKT 4, which are embodied separately from the control device 38, that is, in the injection valves. One performance end stage 46 is preferably assigned to several piezo actuators PAKT 1 to PAKT 4 due to cost reasons. The choice of the respective piezo actuator PAKT 1 to PAKT 4 to be charged or discharged preferably takes place via choice switching elements TSEL 1 to TSEL 4.

During a discharge process, which is controlled by the performance end stage 46, a residual charge remains in the respective piezo actuator PAKT1 to PAKT4 after the given number of discharge pulses. If this residual charge is to be removed from the respective piezo actuator PAKT1 to PAKT4, a current source 48 of the control device 38 is activated, which is provided for this purpose.

The current source 48 comprises a regulator unit 52 and a first switching element T1. The first switching element T1 is embodied and arranged in such a manner that an output current I_A can be adjusted at the output side of the current source 48 depending on a control signal at a control input 54 of the first switching element T1. The output current I_A adjusts itself in the illustrated current direction. It represents a discharge current for the respective piezo actuator PAKT1 to PAKT4. During the operation, the regulator unit 52 generates an input signal at its output, which is the control signal of the first switching element T1.

The current source 48 further comprises a reference resistor R_S, which is electrically coupled to the first switching element T1 in such a manner that a voltage drop over the reference resistor R_S is representative of the output current I_A. A voltage divider comprising resistors R1 and R2 is arranged in an electrically parallel manner to the reference resistor R_S. A control input 56 of a second switching element T2 is electrically coupled to a measuring tap point, which electrically lies between the resistors R1 and R2. The control input of the second switching element T2 is thus loaded with a control signal, which is preferably a voltage U1.

The second switching element T2 influences an input signal of the regulator unit 52, which acts as a control signal on the control input 54 of the first switching element T1. The second switching element is preferably a bipolar transistor in an emitter circuit with a coupling against the current which takes place via a resistor R3. An output 57 of the regulator unit is electrically coupled to the input of the first switching element T1, and to a resistor R7, which is again connected to a supply potential U_V. The resistor R7 thus acts as a series resistor. The switching element T2 thus generates the input signal for the control input 54 of the first switching element in dependence on the voltage drop over the reference resistor R_S. In particular, it drives a current through the resistor R7, the amount of which depends on the voltage drop at the reference resistor R_S. The amount can be adjusted by the corresponding dimensioning of the voltage divider, which is formed by the resistors R1 and R2, the resistor R3, and also the resistor R7 and by the supply potential U_V.

The current flow through the resistor R7 then leads to a voltage drop over the resistor R7 and thus adjusts a voltage U2 at the control input 54 of the first transistor, which preferably forms the control signal at the control input 54 of the first transistor. A desired first amount of the output current I_A of the current source 48 can thus be adjusted by a suitable dimensioning of the resistors R1, R2, R3, R7 and the reference resistor R_S, further the second switching element T2 and the first switching element T1 and the supply potential U_V.

The first amount of the output current can for example be between 2 and 5 A. The first amount of the output current I_A leads to a high heat input into the first switching element T1. The first switching element T1 is dimensioned with regard to its heat storage capacity and its heat removal in such a manner, that it can accommodate the first amount of the output current I_A only for a limited duration without the danger of a thermal damage. It is thereby dimensioned in such a manner that a discharge of the residual charge in the respective piezo actuators PAKT1 to PAKT4 after the completion of the given number of the discharge pulses, which are controlled by the performance end stage 46, can discharge by means of the first amount of the output current I_A via the current source 48.

A third switching element T3 is provided for switching the output current I_A on and off, which is operated in such a manner that the control signal of the first switching element can be brought to a switching-off value as a function of a control signal at its control input 64, by the first switching element not allowing a flow of the output current I_A. The third switching element T3 is therefore preferably electrically coupled to the resistor R7 at its output side, and can couple this electrically to the reference potential GND in dependence on its switching position. This results in that, in the switching position of the third switching element, in which the resistor R7 is electrically coupled to the reference potential GND via the third switching element T3, the voltage U2 takes up a lower voltage level in the vicinity of the reference potential GND, and thus blocks the first switching element T1. However, if the third switching element T3 is in its switching position, in which it does not couple the resistor R7 to a reference potential GND, the voltage U2 can be adjusted by the regulator unit 52. The third switching element T3 is preferably electrically coupled to an output of the control unit of the current source or the control device with its control input 64. The control signal preferably applies a voltage U4 to the control input 64.

The regulator unit 52 further comprises a timing relay 58. The timing relay 58 is formed to limit the first amount of the output current I_A to a maximum duration and afterwards to reduce the amount of the output current I_A. The timing relay comprises a RC member, which is an electrical series connection of a resistor R5 and a capacitor C1. The RC member is arranged in an electrically parallel manner with the reference resistor R_S. The timing relay 58 further comprises a timing relay switching element T_ZG, which has a control input 62, which is electrically coupled to the RC member between the resistor R5 and the capacitor C1. A voltage U3 is preferably applied as input signal to the control input 62 of the timing relay switching element T_ZG. The timing relay switching element T_ZG is electrically coupled to the output 57 of the regulator unit 52 on the output side and thus influences the input signal of the regulator unit and thus the control signal of the first switching element T1. The timing relay switching element T_ZG is preferably a bipolar transistor, which is arranged in an emitter circuit and which is coupled against a current by means of the resistor R4. It thus drives a current through the resistor R7, which depends on the voltage U3 at its control input 62.

If the third switching element T3, starting from its switching position, in which it couples the resistor R7 to the reference potential GND, is controlled into the switching position, in which it decouples the resistor R7 from the reference potential, the first amount of the output current I_A will first adjust itself, namely controlled by means of the second switching element T2, and leads to the corresponding voltage drop over the reference resistor R_S, and thus also over the RC member connected in parallel. This results in the charging of the capacitor C1, until the voltage U3 at the control input of the timing relay switching element T_ZG leads to an interconnection of the timing relay switching element.

The current through the resistor R7 is thus also influenced depending on the voltage U3 at the control input 62 of the timing relay switching element T_ZG, and thereby leads to a reduction of the amount of the output current I_A with a suitable dimensioning of the capacitor C1 and the resistor R5 or also the resistor R4 and R7 and the reference resistor R_S.

A maximum duration can thus be adjusted by suitable dimensioning, while the output current can adopt the first amount. By the integrating behavior of the RC member, an interim switching off of the output current or an interim reduction of the output current can be considered. The maximum duration is thereby suitably provided in such a manner that a thermal damage of the first switching element T1 can be prevented by the heat entry which is introduced by the first amount of the output current I_A.

By the dimensioning of the component of the timing relay 58, that is, the resistors R4, R5, the capacitor C1 and the timing relay switching element T_ZG, the amount of the reduction of the output current I_A can then be further adjusted after the expiration of the maximum duration, and thus a suitable lower second quantity of the output current of for example 100 to 200 mA can be adjusted, by means of which a complete discharge from a fully loaded state of the respective piezo actuators PAKT1 to PAKT4 is possible for example in the case of a failure of the end stage, or the thermal destruction of the first switching element T1 can also be avoided reliably during a short circuit of the output of the current source 48 to the wiring system 40.

But the reduction of the output current I_A caused by the timing relay 58 then leads again to a reduction of the voltage drop over the reference resistor R_S.

The RC member, the resistor R4 and the reference resistor R_S are dimensioned in such a manner that, even with an interconnected timing relay switching element T_ZG, the voltage U3 stays at a value at which the timing relay switching element T_ZG remains interconnected, as long as a current is driven as output current of the current source through an external source. The external source can for example be the respective piezo actuator PAKT1 to PAKT4, or also the voltage source 40.

A relaxation duration then only starts with the omission of the external source, which can also be caused by taking up the switching position of the third switching element T3, into which it couples the resistor R7 with the reference potential GND.

In this manner, the relaxation duration can be adjusted in a suitable manner, after which the timing relay switching element T_ZG blocks again and thus the first amount of the output current can be adjusted again. By a suitable choice of the relaxation duration, the first amount of the output current I_A can on the one hand be adjusted again as fast as possible, but it can also be ensured on the other hand that the first switching element T1 is not thermally overloaded.

A resistor R6 is provided as protective circuit.

Figure 3:
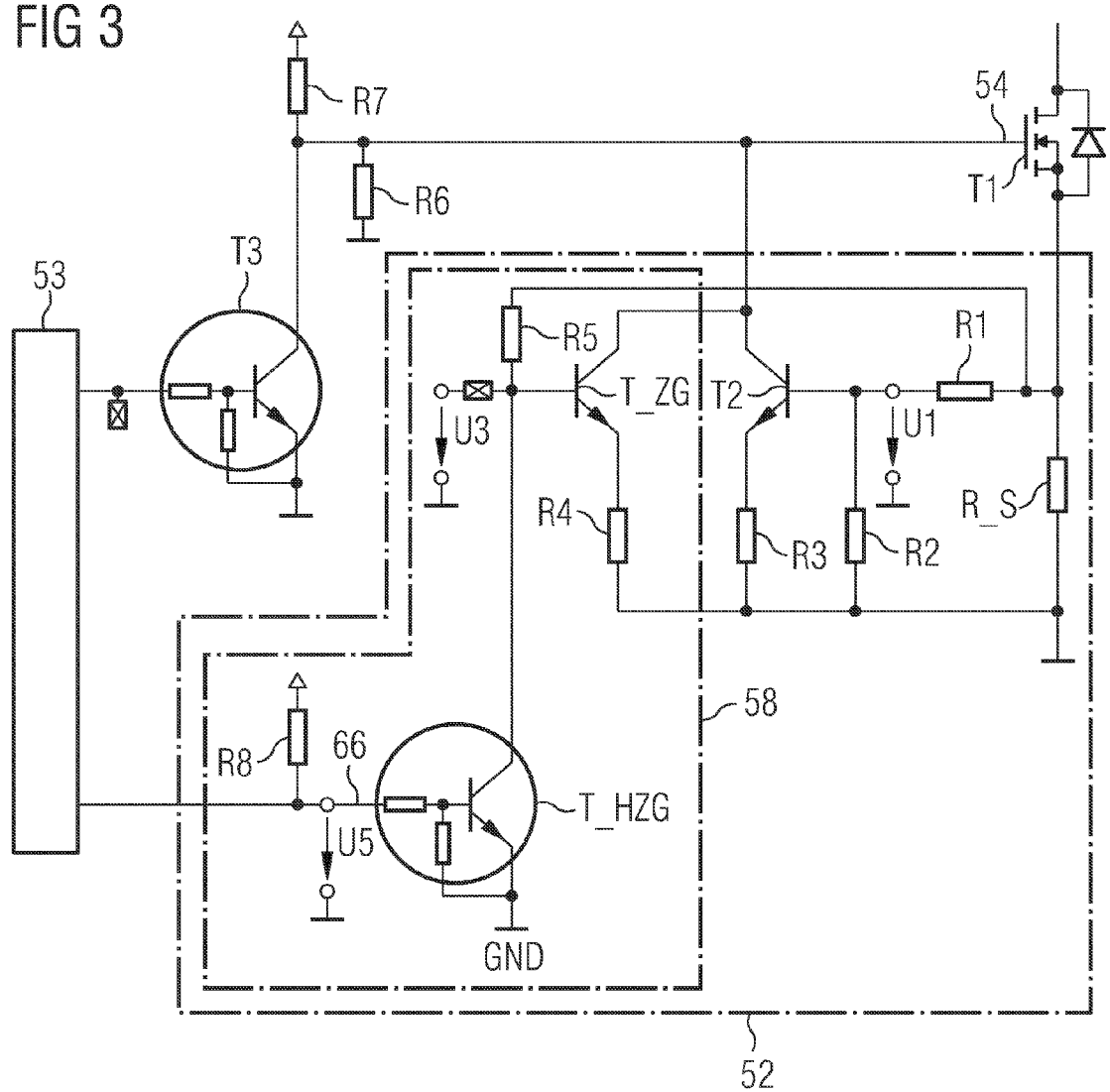
FIG. 3 shows a further embodiment of the current source.

In a second embodiment of the current source 48 (see FIG. 3), the timing relay 58 is distinguished in that the resistor R5 is connected in series with an auxiliary timing relay switching element T_HZG instead of the RC member, namely in such a manner that the resistor R5 can be electrically connected in parallel to the reference resistor R_S in a switching position of the auxiliary timing relay switching element T_HZG, namely through coupling with the reference potential, and is electrically decoupled from the reference potential GND in a further switching position of the auxiliary timing relay switching element T_HZG. In this case, a control input 66 of the auxiliary timing relay switching element T_HZG is preferably electrically coupled to a further output of the control unit, which is also called timer output, and the reduction of the first amount can thus be adjusted at the control input 66 of the auxiliary timing relay switching element T_HZG via corresponding control signals. For this, the control unit 53 is then preferably suitably designed for sensing the output current I_A or a magnitude representing it, and possibly for integrating and thus determining the corresponding maximum duration or relaxation duration. The control signal at the control input 66 of the auxiliary timing relay switching element T_HZG is preferably a voltage U5. A resistor R8 is furthermore preferably provided.

Of course, the timing relay can alternatively also be embodied in such a manner that the maximum duration is not dependent on the integral of the output current and is for example only related to the switching-on of the output current I_A. The same also applies for the relaxation duration.

The invention claimed is:

1. A current source, comprising:
   an output side containing a first switching element having a control input, said first switching element embodied and disposed such that an output current on said output side of the current source can be adjusted at said control input in dependence on a control signal;
   a reference resistor electrically coupled to said first switching element such that a voltage drop over said reference resistor is representative of the output current; and
   a regulator unit receiving an input signal being dependent on the voltage drop over said reference resistor and having a timing relay, the input signal includes the control signal of said first switching element, said timing relay limiting a first amount of the output current to a maximum duration and subsequently reduces an amount of the output current;
   wherein the maximum duration depends on an integral of the output current.

2. The current source according to claim 1, wherein the first amount of the output current can be adjusted again after a given relaxation duration.

3. The current source according to claim 2, wherein the relaxation duration starts with an omission of an external source that drives the output current.

4. The current source according to claim 1, wherein:
   said timing relay contains a RC member having a resistor and a capacitor disposed electrically in series and defining a measuring tap point lying electrically between said resistor and said capacitor, said RC member is disposed in an electrically parallel manner to said reference resistor; and
   said timing relay having a timing relay switching element with a further control input electrically coupled to said measuring tap point of said RC member, said timing relay switching element disposed such that said timing relay switching element influences the input signal of said regulator unit in dependence on a control signal at said further control input.

5. The current source according to claim 1, wherein:
   said timing relay has a resistor and an auxiliary timing relay switching element disposed in series with said resistor and defining a measuring tap point lying electrically between said resistor and said auxiliary timing relay switching element, said resistor being connected electrically parallel to said reference resistor via said auxiliary timing relay switching element; and
   said timing relay having a further timing relay switching element with a given control input electrically coupled with said measuring tap point, said further timing relay switching element disposed such that said further timing relay switching element influences said input signal of said regulator unit in dependence on a control signal at said given control input.

6. The current source according to claim 5, further comprising a control unit having a control output electrically coupled to a control input of said auxiliary timing relay switching element.

7. A control device, comprising:

a current source for controlling a piezo actuator disposed electrically parallel to said current source, said current source being coupled to said piezo actuator such that said current source can discharge the piezo actuator, said current source containing:

an output side containing a first switching element having a control input, said first switching element embodied and disposed such that an output current on said output side of said current source can be adjusted at said control input in dependence on a control signal;

a reference resistor electrically coupled to said first switching element such that a voltage drop over said reference resistor is representative of the output current; and a regulator unit receiving an input signal being dependent on the voltage drop over said reference resistor and having a timing relay, the input signal includes the control signal of said first switching element, said timing relay limiting a first amount of the output current to a maximum duration and subsequently reduces an amount of the output current; and a performance end stage connected for charging and discharging the piezo actuator;

wherein the maximum duration depends on an integral of the output current.

* * * * *